United States Patent [19]
Cerutti et al.

[11] 3,998,619
[45] Dec. 21, 1976

[54] VERTICAL GLASSMAKING FURNACE AND METHOD OF OPERATION

[75] Inventors: Richard L. Cerutti, Seminole; Leonard A. Knavish, Plum Borough, both of Pa.

[73] Assignee: PPG Industries, Inc., Pittsburgh, Pa.

[22] Filed: Jan. 19, 1976

[21] Appl. No.: 650,389

[52] U.S. Cl. .................. 65/136; 65/337; 65/347; 65/DIG. 4; 13/6

[51] Int. Cl.² .......................... C03B 5/02

[58] Field of Search ....... 65/337, 347, 136, DIG. 4; 13/6

[56] References Cited
UNITED STATES PATENTS

| | | |
|---|---|---|
| 3,520,979 | 7/1970 | Scarfe et al. .................. 13/18 |
| 3,583,861 | 6/1971 | Preston ...................... 65/347 X |

*Primary Examiner*—Arthur D. Kellogg
*Attorney, Agent, or Firm*—E. Kears Pollock

[57] ABSTRACT

A vertically elongated glassmaking furnace is provided with two groups of electrodes: one group is positioned in the upper portion of the furnace and is operated to melt glass batch and to establish an upward flow of hot glass along the center of the furnace; a second group is positioned in the lower portion of the furnace and operated to slow the downward flow of molten glass through the furnace, particularly near the walls of the furnace so that all the molten glass in the lower portion of the furnace flows uniformly downwardly to discharge at a rate sufficiently slow to insure the upward escape of seeds or bubbles from the discharged glass.

6 Claims, 3 Drawing Figures

VERTICAL GLASSMAKING FURNACE AND METHOD OF OPERATION

BACKGROUND OF THE INVENTION

This invention relates to the making of glass. More particularly, it relates to an improved method of melting and refining glass in a vertically elongated electric melting furnace.

Vertically elongated glass melting furnaces having peripheral heating electrodes have been known in the art of glass making for many years. Illustrative of the state of the art are the following references: U.S. Pat. Nos. 2,186,178 to Ferguson, 2,263,549 to Peyches, 3,524,206 to Boettner et al., 3,583,861 to Preston, 3,725,588 to t'Serstevens, 3,742,111 to Pieper and 3,755,606 to Boettner et al. and in several foreign patents Swedish No. 80,130, Italian No. 298,239, German (W) No. 736,937 and French No. 1,305,805.

The patents of Peyches, Boettner et al. and Preston show sidemounted electrodes at a plurality of elevations to heat molten glass in the illustrated furnaces and to heat and melt glass batch materials floating on the molten glass by radiation and convection through the molten glass and conduction from it to the unmelted batch materials. In Boettner et al. U.S. Pat. No. 3,524,206 the heat energy applied to a furnace at any given elevation is greater than the heat energy applied at any lower elevation. In Preston the heat energy applied at a lower elevation of a furnace is sufficient to create an upward or countercirculation of glass particularly at the periphery of the furnace so that the downward flow of glass from an upper portion at a higher elevation of the furnace is nullified. The patent of Boettner et al. includes a scheme for increasing contact between unmelted batch and molten glass by encouraging the bottom surface of the floating glass batch to assume a conical shape similar to the depressed shape shown in U.S. Pat. No. 2,397,852 to Gentil. The German patent shows outwardly-tapered side walls near the top of a furnace, and the patent of Preston illustrates inwardly-tapered side walls near the bottom of a furnace.

While the glassmaking furnaces described in the prior art are all apparently useful for the melting of glass batch to prepare molten glass, the vertically elongated glassmaking furnaces of the past with their heating electrodes are not believed to be as thermally efficient as desired, nor to refine the molten glass sufficiently to provide for the making of high-quality flat glass. It is an objective now to provide an improved method of operation for vertically elongated, electrically heated glassmaking furnaces and to provide certain improvements to such furnaces themselves.

SUMMARY OF THE INVENTION

A vertically elongated, electrically heated glassmaking furnace having a height of from three to five times its inside width is provided with an outwardly flared, upper portion and with at least two groups of electrodes at different elevations extending into it through its side walls.

The furnace has a cross-sectional shape (in plan) which is circular or regular polygonal, preferably a nonagon (nine-sided) when using three-phase power or an octagon (eight-sided) when using two-phase power. The walls of the furnace are constructed of refractory materials which are held together and supported by a steel framework external to the furnace. The upper, outwardly flared portion of the side walls extends to provide an upper width at an elevation of an intended glass line of at least about 1.2 times the width of the main portion of the furnace. It flares outwardly at an angle from the vertical of from 15° to 45°, preferably about 30°, from the vertical. The inside of the furnace near the bottom is tapered inwardly to a central discharge so that the flow of molten glass to discharge leaves a thermally symmetric environment in the furnace.

The first group of electrodes may comprise one or two sets of electrodes. The electrodes are provided about the periphery of the furnace just below its upper, outwardly flared section. The electrodes are arranged and powered using three-phase electric power in a manner to provide for the establishment of a hot spot in the center of the furnace. This is accomplished by Joule heating the molten glass preferentially where the electric current density is greatest at the center of the furnace where several independent current paths intersect. These electrodes are operated to provide a vigorous upward flow of molten glass in the center of the furnace. This rising cylinder of molten glass moves upwardly along the central axis of the furnace then divided in the vicinity of an overlying layer of unmelted glass batch in the wider, upper portion of the furnace. The glass flow continues as a plurality of outwardly moving radial flows which turn downwardly near the tapered or flared side walls. After turning downwardly, the glass flows inwardly and then directly downwardly in conformance to the shape of the inside of the furnace.

As the molten glass flows downwardly along the vertical walls of the furnace, it is engaged by the second group of electrodes comprising a plurality of peripherally mounted electrodes which are energized in a manner to provide a controlled amount of heat to the molten glass about the periphery of the furnace. Care is taken to avoid supplying so much heat as to cause a counterflow of molten glass upwardly along the periphery of the furnace for such upward flow would continue as an inward flow to the center of the furnace and downwardly from there as a canalized flow to the bottom discharge of the furnace. By the proper adjustment of heat introduced about the periphery of the furnace, it has been found that molten glass flow in the bottom of the furnace can be made to flow uniformly downwardly throughout the whole cross section of the bottom portion of the furnace. This results in a uniformly, refined stream of molten glass to be discharged from the furnace.

With the power properly applied to the lower group of electrodes, the maximum downwardly velocity of molten glass in the lower portion of the furnace is about the same as the terminal rise velocity for a gas bubble (0.5 mm diameter) through the molten glass as estimated, using the well-known Stokes law for the rise of buoyant elements through fluids.

This invention may be further appreciated with reference to the drawings accompanying this disclosure.

DESCRIPTION OF THE PREFERRED EMBODIMENTS

Figure 1:
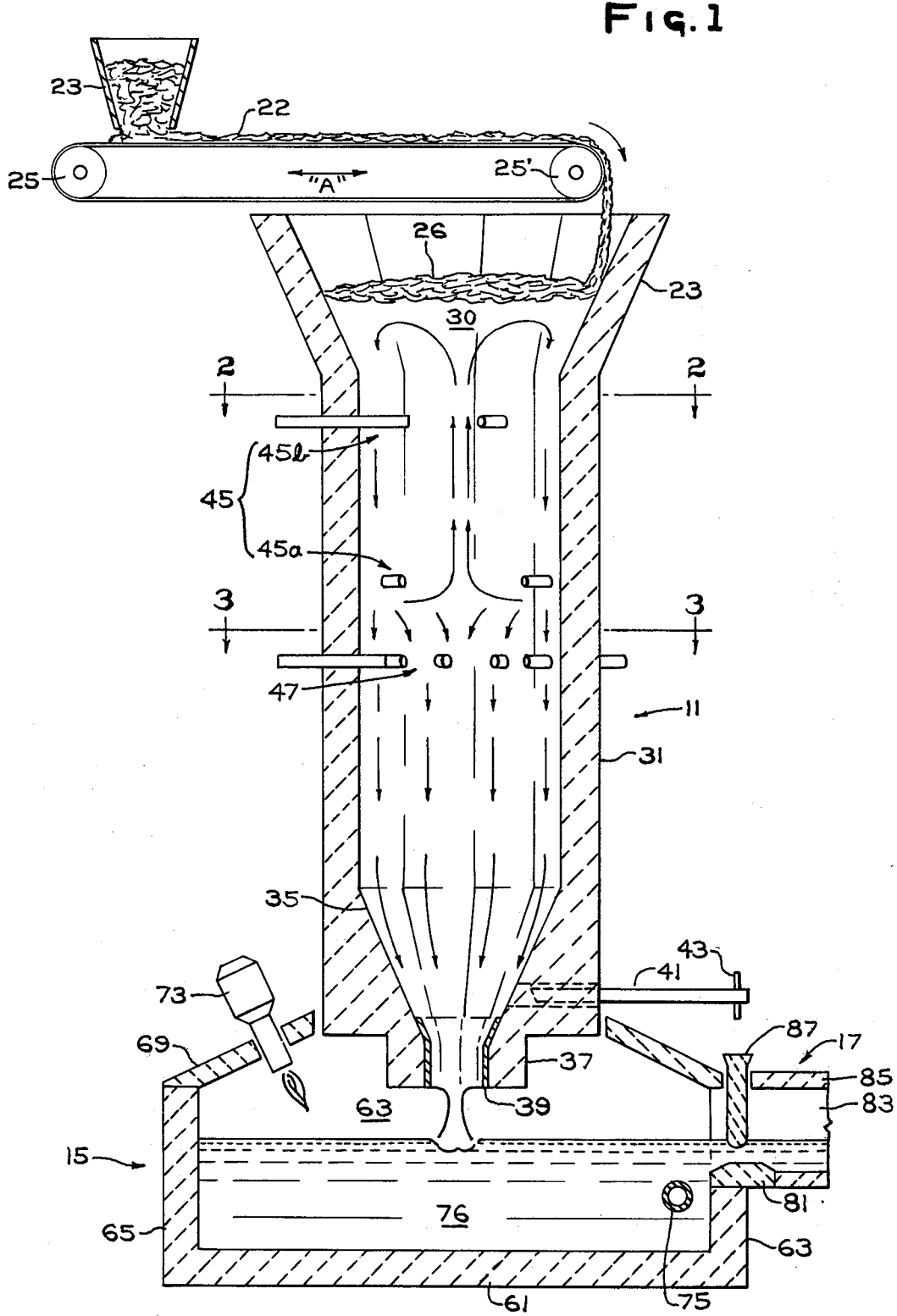
FIG. 1 is a schematic sectional elevation view of a glassmaking furnace embodying the principles of this invention.
Figure 3:
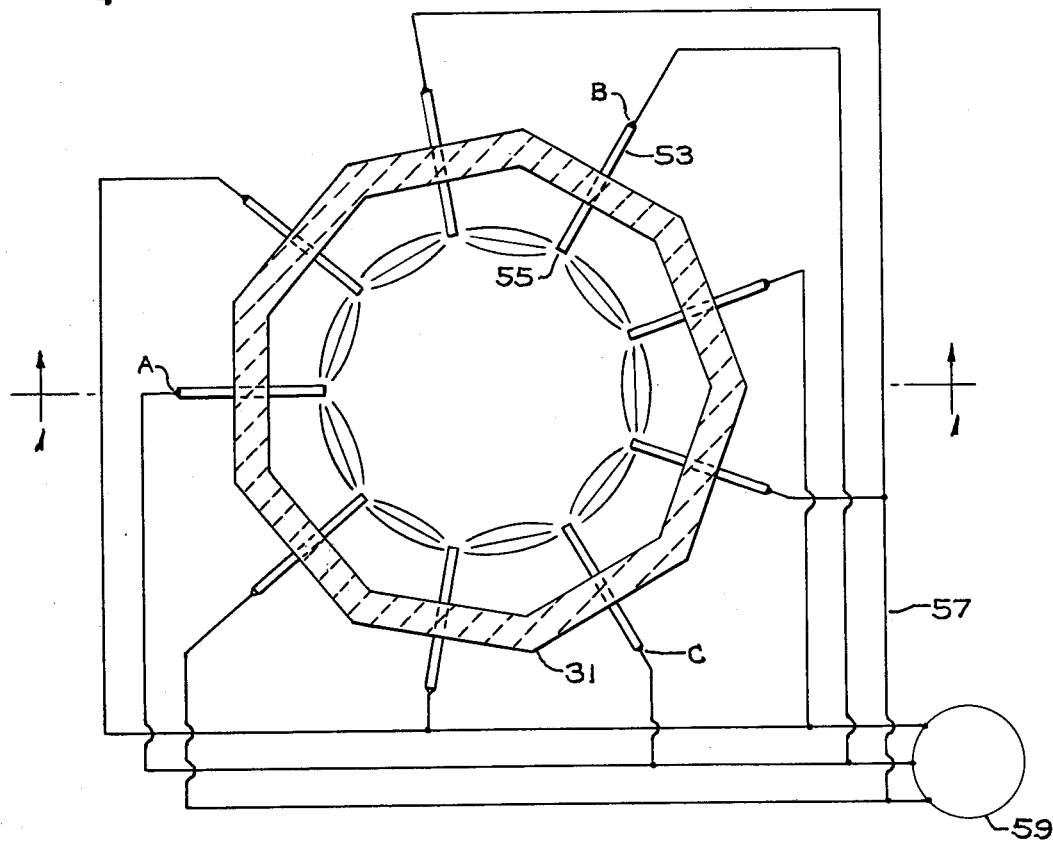
FIGS. 2 and 3 are schematic sectional plan views of the glassmaking furnace of FIG. 1 taken respectively along section lines 2—2 and 3—3.
Figure 2:
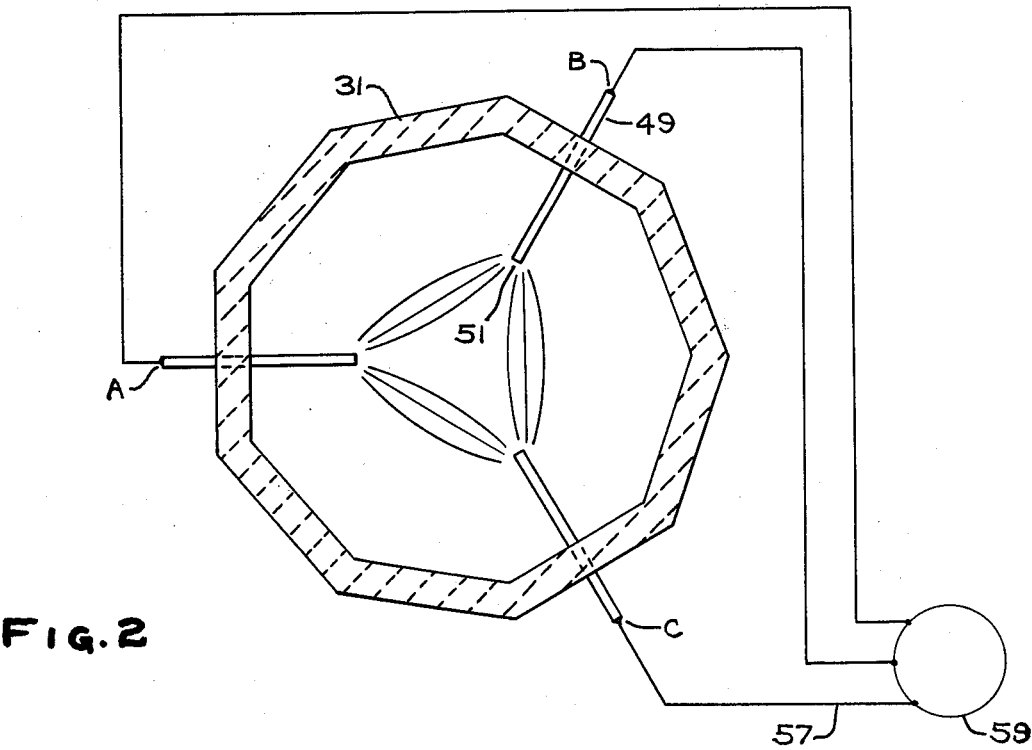

Referring now to FIGS. 1, 2 and 3, there is shown a glassmaking facility which is designed and operated according to this invention. A vertically elongated melting furnace 11 is provided with an apparatus 13 for feeding or charging glass batch materials, including cullet if desired, to it. The facility further includes a molten glass conditioner 15 and a glass delivery facility 17 for discharging molten glass to a forming system, such as a drawing machine, a rolling machine or a forming chamber containing molten metal upon which a continuous sheet of flat glass may be formed.

The batch feeding apparatus may be any conventional, or otherwise convenient, device for feeding particulate, caked, pelletized or briqueted glass batch materials. A bucket conveyer, vibratory feeder or belt 21 (as shown) may be employed. The belt 21 is fed with batch 22 from a hopper 23 and is mounted on driving and driven rolls 25, 25' which, in turn, may be mounted on a translatable carriage (not shown) to move the belt assembly back and forth as shown by double-headed arrow "A". Such movement insures that there is maintained at the top of the furnace a continuous layer of batch 26 over a pool or column of molten glass 30 within the furnace 11. This continuous layer of batch 26 serves to thermally insulate the molten glass 30 from the cooler outside environment above it.

The furnace 11 comprises vertical side walls 31 forming a generally cylindrical or polygonal shape (a preferred nine-sided furnace is shown). These walls 31 and the remainder of the furnace are supported by external structural steel work or other conventional supports (not shown). The upper portion of the furnace 11 has outwardly flared walls 33 to provide a larger batch 26-glass 30 interface than would be possible were the width of the furnace to be maintained at the top as between side walls 31. The combination of the outwardly flared walls 33 and the generally vertical side walls is effective to provide for flowing molten glass near the walls 31 and 33 to have a longer path length between given elevations than the path length for a glass flow along the central axis of the furnace. This helps to slow downward peripheral flows as will be discussed below.

The bottom portion of the furnace 11 has a funnel-like inner wall 35 terminating in a nozzle 37 which is preferably lined with a liner 39 or corrosion- and erosion-resistant material, such as fused cast silica, molybdenum or platinum. Preferably, the bottom portion of the furnace includes a device 41 for closing the entrance to the nozzle 37. This may be a cooled plate having connectors 43 for connection to a source of coolant such as water.

Extending into the furnace 11 through its side walls 31 are at least two groups, 45 and 47, of heating electrodes. The upper group 45 of electrodes may include electrode sets 45a and 45b at a plurality of elevations as shown.

The upper group 45 of electrodes comprises two sets 45a and 45b of three electrodes 49 each. The three electrodes of each set are positioned so that their interior tips 51 lie at the corners of and define an equilateral triangle. The interior tips 51 of the electrodes 49 are located between the center axis of the furnace and a circle about that axis having a radius of three-eights of the width of the furnace. Thus, when the electrodes 49 of sets 45a and 45b are energized by connection through conductors 57 to a source 59 of three-phase electric power, the heat generated in the glass is generated primarily in a central core of glass about the center axis of the furnace.

The lower group 47 of electrodes comprises a single set of nine electrodes 53. These electrodes are positioned so their interior tips 55 lie in a circle having its center at the center axis of the furnace and having a radius of from three-eights to about nine-twentieths of the width of the furnace. Thus, the tips 55 of electrodes 53 are even with or outside of the tips 51 of electrodes 49. This arrangement greatly assists in controlling the flow of molten glass in the furnace. These electrodes 53 are connected in sequential sub-groups of three to a source 59 of three-phase electric power. When energized, the electrodes generate heat in the molten glass close to the side walls 31 of the furnace. By adjusting the power to these electrodes 53 the molten glass flowing downwardly along the side walls 31 is slowed and directed slightly inwardly. Below the electrodes 53 molten glass flows uniformly downwardly throughout the whole cross section of the lower portion of the furnace.

The described glassmaking furnace preferably has an inside height (including the bottom tapered funnel and the top flared portion) up to a desired molten glass surface that is from three to five times the inside width of the furnace. The lower group of electrodes is preferably near the midsection of the furnace but, in any event, is sufficiently spaced from its lower discharge to permit the flow of glass below these electrodes to be substantially unhindered (thermally or mechanically) for a distance at least equal to the width of the furnace. The upper group of electrodes should have at least one set closely spaced above the lower group of electrodes. If the upper and lower groups of electrodes are too widely spaced from one another, the lower group is more likely to induce an undesired circulation flow of its own, rather than serving to slow the downward flow induced by the heating from the upper group. The upper group of electrodes should have a set of electrodes less than half the width of the furnace above the lower group of electrodes.

The conditioner 15 is a substantially enclosed vessel comprising a refractory bottom 61, side walls 63, end walls 65 and 67 and cover tile or flat arch roof sections 69, 71. The conditioner is preferably provided with a burner 73 or other heating means, such as a resistance heater, to adjust and maintain the temperature of molten glass delivered to the conditioner 15. Also, it is desirable to provide one or more coolers 75 in the conditioner 15 to adjust and maintain the temperature of molten glass in it. In a preferred embodiment the horizontal length of walls 63 is greater than the length of walls 65 and 67 and a horizontally elongated pool of molten glass 76 is established in the conditioner 15. The cooler 75 is submerged in the pool of molten glass 76, and its cooling effect, along with the heating effect of heater 73, causes glass in the conditioner to flow uniformly toward its discharge end wall 67.

The glass delivery facility 17 may be the kiln of a drawing machine, the canal of a float unit, the forehearth of a fiber bushing or of a bottle machine but in the preferred embodiment is a threshold delivery facility for the direct, substantially horizontal delivery of a layer of molten glass onto molten metal in an attached forming chamber. The facility includes a threshold 81, jamb blocks 83, a roof cover 85 aand a metering member 87.

Soda-lime-silica glass comprising from 65 to 80 percent silica may be melted and refined in the manner described here. The furnace is started by first closing the bottom nozzle by inserting cooled plate 41. Cullet is placed in the lower portion of the furnace and, while the electrodes are retracted so their tips are closely adjacent the walls 31 of the furnace, a portable gas or oil burner is lowered into the furnace just above the cullet in the bottom of the furnace. This burner is fired to melt the cullet and is gradually raised as additional cullet is added to the furnace. When the burner has been raised out of the furnace and the top surface of the molten glass produced by melting the cullet has risen above the uppermost set of electrodes, the electrodes are inserted inwardly to their operating positions and power is applied to them. The burner is then removed completely and cullet is fed to the furnace until the top surface of the molten glass rises into the upper, flared section of the furnace to its desired level. Then the desired batch-cullet mixture is charged to the furnace to maintain the level of molten glass in it as the cooled plate 41 is withdrawn and molten glass permitted to flow from the furnace.

While the furnace is being initially charged, the conditioner is also prepared for operation. Temporary, auxiliary burners are inserted through temporary openings made in the conditioner cover plates 69 and 71. Cullet is charged to the conditioner through temporary openings in the cover plates as the auxiliary burners are fired so that the conditioner is loaded with molten glass when the furnace is ready for delivering molten glass to it.

Once the furnace has been started, the power applied to the groups of electrodes is adjusted until the above-described flows are established. Flows may be detected by submerging a buoyant refractory ball into the furnace at various depths and horizontal positions and releasing it. The elapsed time until surfacing and the location of surfacing are noted. By subtracting the Stokes rise (calculated) velocity from that measured for the actual rise time, the glass flow (drag) velocity effect may be determined.

While this invention has been described with reference to particular embodiments of it, those skilled in the art will recognize that certain variations may be made without departing from the spirit of this invention or from the scope of the claims defining it. For example, the upper electrodes may conveniently employ crossed, two-phase powered electric fields as taught in the copending application of Harry S. Koontz filed on even date herewith.

We claim:
1. A furnace for melting and refining glass comprising
   a. a vertically elongated chamber for holding molten glass having an uppermost portion having its walls flared outwardly from the walls of its major portion at a sufficient angle and for a sufficient length to provide an upper batch receiving portion which provides a cross-sectional area at which a batch-molten glass interface may be maintained which is substantially greater than the cross-sectional area of the major portion of the furnace and having a lowermost portion that is tapered inwardly and provided with a discharge opening;
   b. means for charging glass batch materials to the chamber as a layer over substantially all of its uppermost outwardly flared portion at a rate sufficient to maintain molten glass in the chamber with a glass batch interface in the outwardly flared portion;
   c. at least two groups of electrodes, a first group and above it a second group, extending inwardly into the chamber at two different elevations, both above the midsection of the chamber, wherein the first group of electrodes comprises at least eight electrodes at a common elevation about the periphery of the chamber and extending only slightly inwardly from its walls, wherein the second group of electrodes comprises at least three electrodes at at least one elevation closely spaced above the elevation of the first group of electrodes with the at least three electrodes extending inwardly into the chamber farther than those of the first group, and wherein the electrodes are connected to a source of electric power for energizing the electrodes to heat molten glass in the chamber and for controlling flows therein; and
   d. means for receiving molten glass from the vertically elongated chamber through its discharge opening and for delivering molten glass for forming.

2. The furnace according to claim 1 wherein the uppermost outwardly flared walls flare outwardly sufficiently to provide for a cross-sectional area at which a batch-molten glass interface may be maintained which has a width at least about 1.2 times the width of the major portion of the furnace.

3. The apparatus according to claim 1 wherein the inside height of the vertically elongated chamber is from three to five times its width.

4. The apparatus according to claim 1 wherein the electrodes of the upper group of electrodes extend inwardly a sufficient distance so their tips are spaced from the center vertical axis of the chamber within a circle centered on the axis and having a radius of three-eighths of the width of the furnace.

5. A method of melting and refining glass in a vertically elongated furnace comprising the steps of
   a. charging glass batch materials as a layer onto the surface of a pool of molten glass maintained in the furnace while maintaining the area of a substantially horizontal glass batch molten glass interface sufficiently greater than the horizontal cross-sectional area of a major portion of the pool of molten glass to enhance the melting batch;
   b. heating the molten glass at a first, upper elevation above the midsection of the pool of molten glass, wherein the glass is heated in a central core at said first, upper elevation sufficient to establish an upward flow of molten glass in the central portion of the pool of molten glass causing the upwardly flowing molten glass near the batch-molten glass interface to flow radially outwardly and then to turn and flow downwardly along the periphery of the pool of molten glass;
   c. heating the molten glass about the periphery of the pool of molten glass at a second, lower elevation than said first elevation at a sufficiently low temperature to maintain the downward peripheral flow of molten glass at a rate sufficiently decreased to prevent the formation of local convective counterflow of molten glass at said second, lower elevation whereby a downwardly canalized flow of molten glass through the lower portion of the pool below its midsection is prevented; and d. discharging a portion of the downwardly flowing molten glass from the lower portion of the pool of molten glass for forming the discharged glass into flat glass.

6. The method according to claim 5 wherein the discharged molten glass is directed through an intermediate pool of molten glass in which its temperature and flows are adjusted to establish a horizontally flowing layer of molten glass prior to delivery for forming.

* * * * *